United States Patent [19]
Ohshima et al.

[11] Patent Number: 5,402,395
[45] Date of Patent: Mar. 28, 1995

[54] DRIVING DEVICE FOR A ROTARY MEMBER

[75] Inventors: Kenji Ohshima; Susumu Shinmyo; Takuo Urabe, all of Tokyo, Japan

[73] Assignee: Seikosha Co., Ltd., Japan

[21] Appl. No.: 795,813

[22] Filed: Nov. 21, 1991

[30] Foreign Application Priority Data

Nov. 29, 1990 [JP] Japan ................................. 2-332889
Mar. 8, 1991 [JP] Japan ................................. 3-043718

[51] Int. Cl.$^6$ ...................... G04B 19/00; G04B 17/02; G04F 5/00
[52] U.S. Cl. ........................ 368/76; 368/165; 368/179; 368/223
[58] Field of Search ............. 368/134, 165, 178–180, 368/76, 80, 223, 88, 157, 160

[56] References Cited

U.S. PATENT DOCUMENTS

| | | | |
|---|---|---|---|
| 3,990,226 | 11/1976 | Fehrenbacher | 368/165 |
| 4,038,588 | 7/1977 | Woolfson et al. | 368/179 |
| 4,482,260 | 11/1984 | Fehrenbacher | 368/180 |
| 4,899,324 | 2/1990 | Barbieri et al. | 368/76 |
| 4,985,877 | 1/1991 | Namisato | 368/76 |
| 5,151,886 | 9/1992 | Miyazawa | 368/157 |
| 5,195,063 | 3/1993 | Moriya | 368/85 |

FOREIGN PATENT DOCUMENTS

| | | |
|---|---|---|
| 3110784 | 3/1981 | Germany . |
| 8321259 | 1/1984 | Germany . |
| 3830398 | 3/1990 | Germany . |

Primary Examiner—Vit W. Miska
Attorney, Agent, or Firm—Bruce L. Adams; Van C. Wilks

[57] ABSTRACT

A driving device has a stepping motor for reciprocatively rotationally driving a decorative rotary member. A memory circuit stores a data table on the basis on which the operation timing of the stepping motor is determined. A control circuit controls the application of actuation pulses to the stepping motor on the basis of the data stored in the memory circuit. The data table is made up of numeric values representative of the inter-pulse spacing of the actuation pulses, the inter-pulse spacing being selected such that the rotational speed of the rotary decorative member varies in conformity with a sine curve or the rotation angle of the decorative rotary member varies in conformity with a secant function.

20 Claims, 9 Drawing Sheets

5,402,395

DRIVING DEVICE FOR A ROTARY MEMBER

BACKGROUND OF THE INVENTION

The present invention pertains generally to a driving device for a rotary member. In particular, the present invention pertains to a driving device for a rotary member which is used, for example, in driving a decorative rotary member of a mantel clock.

Mantel clocks having a decorative rotary member are known in the art. A decorative rotary member is provided to enhance the ornamentation of the clock. Generally, this decorative rotary member is attached to a vertical output shaft which is rotatable in a horizontal plane. Various mechanisms are known for reciprocatively rotating the decorative rotary member.

A first type of conventional mechanism uses a motor which is rotatable in only one direction to rotate the decorative rotary member via a reduction wheel train. To reciprocatively rotate the decorative rotary member, a sector gear is provided which is engaged with the wheel train. An arm is integrally connected on the sector gear, and a pair of pins is disposed within the swingable range of the arm so that when the distal end of the arm strikes against either pin, the resulting reaction reverses the rotational direction of the decorative member. An example of this mechanism is disclosed, for example, in Japanese Utility Model Laid-Open No. 59-62589 and Japanese Utility Model Publication No. 63-44767.

Another type of conventional mechanism for reciprocatively rotating a decorative rotary member is disclosed, for example, in Japanese Utility Model Publication No. 60-21821. The mechanism disclosed utilizes a temp motor of a transistorized clock. An output shaft of the temp motor is supported so as to be rotated via a hair spring, so that the decorative rotary member is smoothly rotated in a motion which conforms to a sine curve by virtue of the hair spring, thereby exhibiting graceful motion.

In accordance with the first type of conventional mechanism for rotating the decorative rotary member, the direction of rotation of the motor is reversed by mechanical means thereby making it difficult to smoothly vary the rotation speed of the rotational shaft. Therefore, the motion of the decorative rotary member is awkward and is not graceful. On the other hand, in accordance with the second type of conventional mechanism, the decorative rotary member is rotated via the hair spring, which makes its motion graceful. However, the spring constant of the hair spring must be determined, taking into consideration the mass, rotation angle and rotational period of the decorative rotary member. This complicates the design and manufacture of the mechanism, requiring an increased number of parts and increasing the cost. Furthermore, since the temp mechanism which acts as a driving source is formed by arranging permanent magnets and coils alternately with given gaps, the overall thickness of the mechanism is relatively large, which is disadvantageous to the design of a mantel clock having a decorative rotary member.

SUMMARY OF THE INVENTION

It is an object of the present invention to alleviate the drawbacks of the prior art. In particular, one object of the present invention to provide a driving device for a rotary member which has a small overall thickness and is low in cost. It is another object of the present invention to provide a driving device for reciprocatively driving a decorative rotary member so that the decorative rotary member is driven with a graceful motion without requiring the use of a hair spring.

In accordance with the present invention, a driving device for driving a rotary member includes driving means such as a stepping motor for reciprocatively driving the rotary member. Storing means is provided for storing data, and controlling means is provided for controlling the stepping motor by actuation pulses dependent on the stored data, whereby the controlling means applies a driving energy to the driving means during a duration of each actuation pulse. The data may include numeric values representative of inter-pulse spacing of the actuation pulses and which are effective to control the rotational speed of the rotary member in conformity with a sine curve. The data may also include numeric values representative of inter-pulse spacing of the actuation pulses which is effective to control the rotation angle of the rotary member in conformity with a secant function.

The storing means may include a memory circuit for storing a data table on the basis of which the operation timing of the stepping motor is determined. The controlling means may include a control circuit for controlling the actuation pulses on the basis of the data stored in the memory circuit.

In operation, in accordance with the present invention, the control circuit reads the data stored in the memory circuit and controls the operation timing of the stepping motor in accordance with this data. The stepping motor performs its stepping action in response to normal-rotation actuation pulses applied at appropriate operation timings. When the number of actuation pulses reaches a predetermined count corresponding to a half cycle of a sine curve, the control circuit delivers a reverse-rotation actuation pulse to reverse the rotation of the stepping motor. When the data includes numeric values which are representative of inter-pulse spacing of the actuation pulses effective to control the rotational speed of the rotary member in conformity with a sine curve, the rotational speed of the stepping motor varies smoothly, so that the reciprocative rotational motion of the decorative rotary member is graceful and exhibits a sine curve-like speed variation. Thus, in accordance with the present invention, a driving device for driving a rotary member is provided which can reciprocatively drive a decorative rotary member in a smooth and graceful manner.

DETAILED DESCRIPTION OF THE INVENTION

Figure 1:
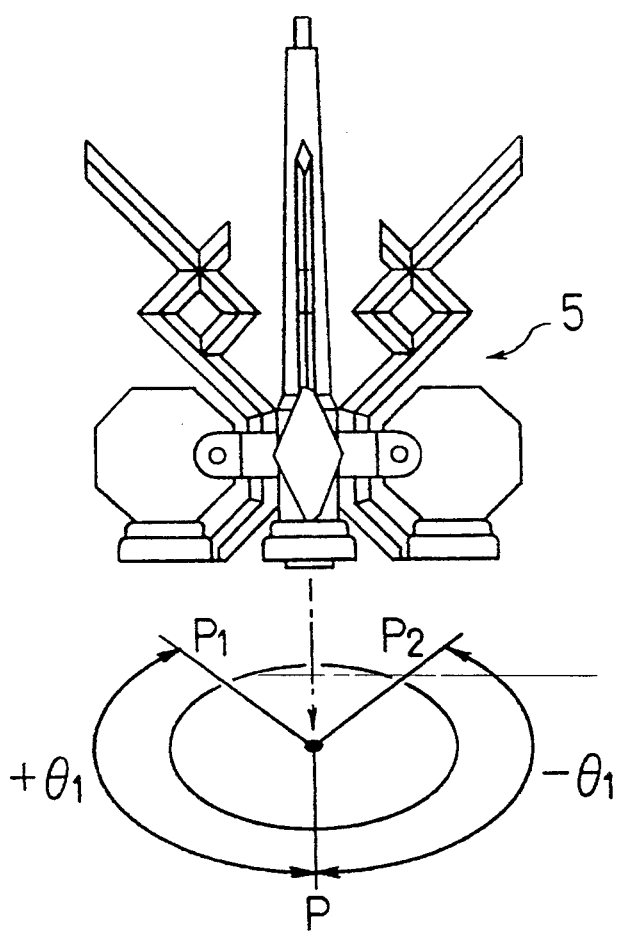
FIG. 1 is plan view showing an example of a decorative rotary member and its rotation angle.

Referring to FIG. 1, a decorative rotary member 5 and its rotation angle is shown. In this view, the front of the decorative rotary member 5 is at the position of point P. Upon being driven, the decorative rotary member 5 rotates clockwise through an angle $+\Theta 1$ so that the front of the decorative rotary member 5 moves to point P1. Next, the decorative rotary member 5 rotates counterclockwise so that the front moves from point P1 back to point P, and finally rotates counterclockwise through an angle of $-\Theta 1$ so that the front moves from point P to point P2. Thus, the decorative rotary member 5 undergoes a reciprocative rotational motion of one cycle so that the front of the decorative rotary member 5 reciprocates between the three points P1, P and P2.

Figure 2:
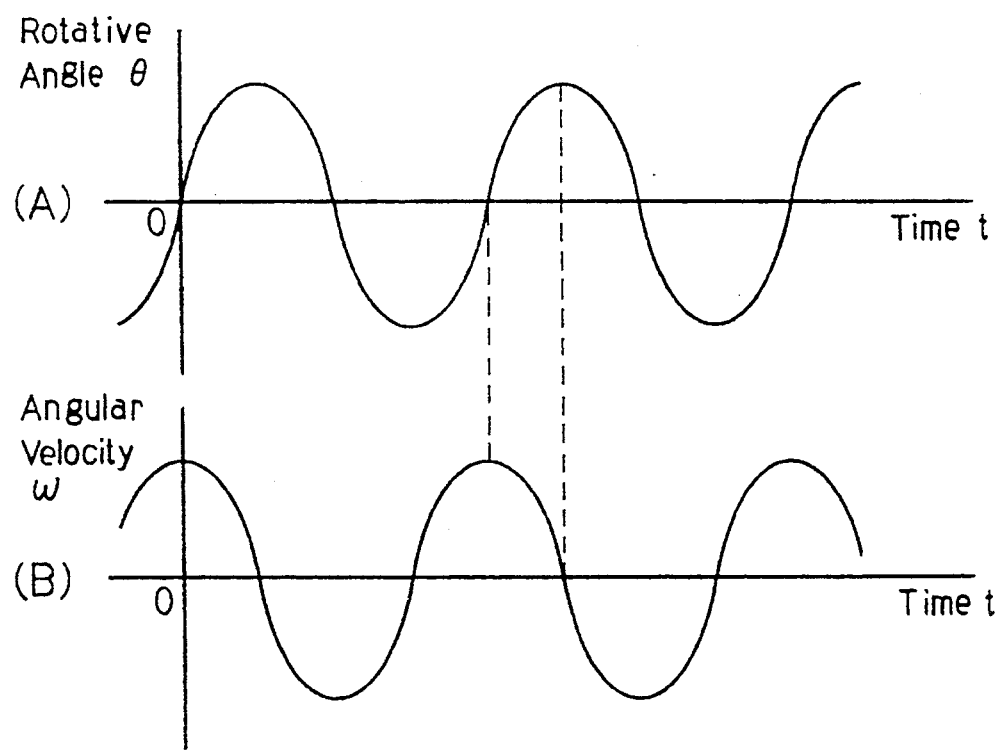
FIG. 2 is a graph showing the relationship between the rotation angle and the angular velocity of the decorative rotary member.

As shown in FIG. 2, the rotation angle $\Theta$ of the decorative rotary member 5 has a relation to time t which is represented by a sine curve (FIG. 2(A)). The angular velocity $\omega$ of the decorative rotary member 5 has a relationship to time t which is represented by a cosine curve (FIG. 2(B)). In other words, the foregoing two variables may be expressed by $$\text{rotation angle: } \Theta = \Theta_{max} \times \sin t;$$

$$\text{angular velocity: } \omega = \omega_{max} \times \cos t;$$

where $\Theta_{max}$ is the maximum rotation angle and $\omega_{max}$ is the maximum angular velocity. Therefore, the variation of the speed of the decorative rotary member 5 which is driven by a stepping motor in conformity with a sine curve can be attained by varying the speed of the stepping motor in conformity with a cosine curve of given period.

Figure 3:
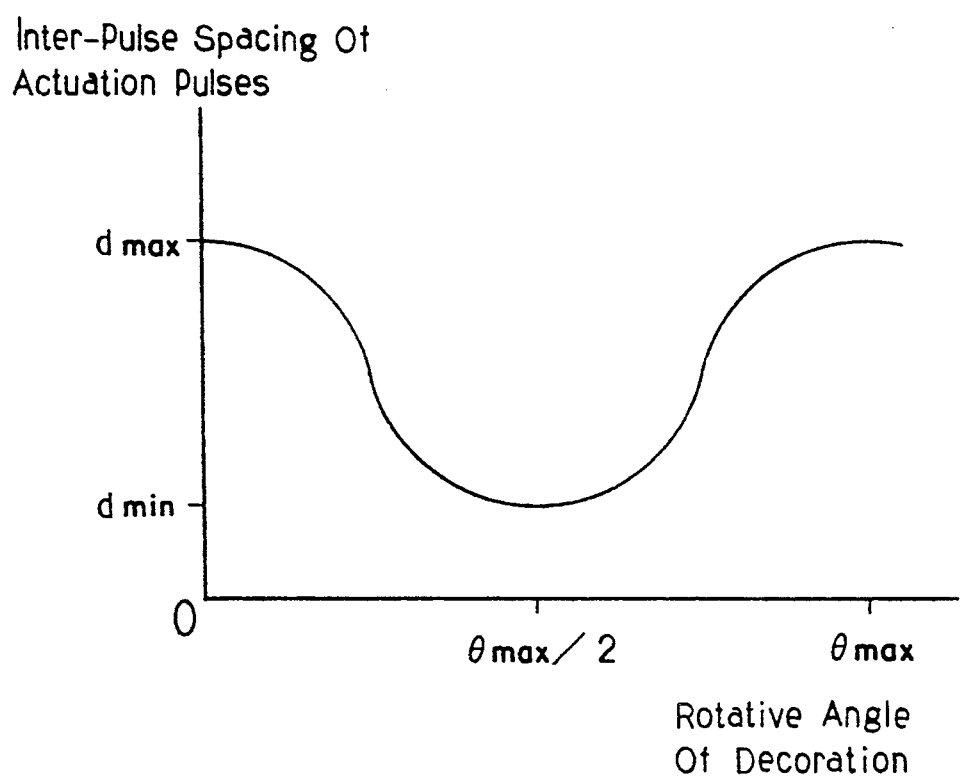
FIG. 3 is a graph showing the relationship between the inter-pulse spacing of actuation pulses and the rotation angle.
Figure 4:
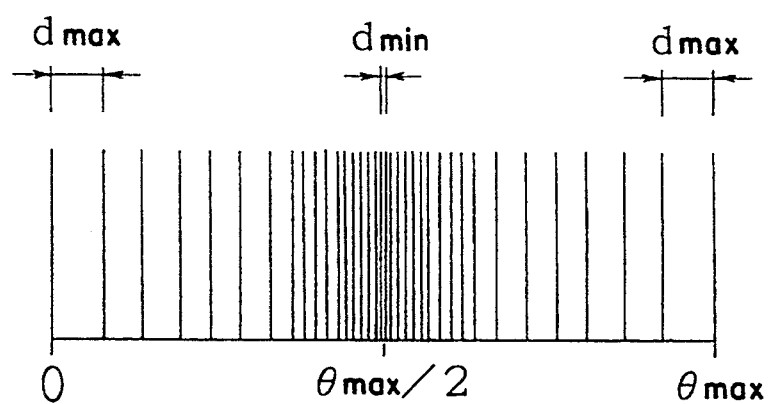
FIG. 4 is a waveform diagram of the actuation pulses.

Referring to FIGS. 3 and 4, the speed control of the rotating decorative rotary member 5 can be obtained by making the inter-pulse spacing d of the actuation pulses supplied to the stepping motor narrow when the angular velocity $\omega$ of the decorative rotary member 5 should be relatively large and by making the inter-pulse spacing d of the actuation pulses supplied to the stepping motor wide when the angular velocity $\omega$ should be relatively small.

In accordance with one embodiment of the present invention, the inter-pulse spacing d of the actuation pulses supplied to the stepping motor is made to correspond to the inverse of the angular velocity $\omega$ with respect to individual rotation angles $\Theta$ of the rotating decorative rotary member 5. If the angular velocity $\omega$ of the decorative rotary member 5 is represented by a cosine function, the inter-pulse spacing d of the actuation pulses can be represented by a secant function. In other words, the relationship between the inter-pulse spacing d and the rotation angle $\Theta$ can be expressed by $$d = a \times \sec \Theta = a/\cos \Theta;$$

where a is a constant, exclusive of 0.

When the rotation angle $\Theta 1$, corresponding to half a cycle of the rotation of the decorative rotary member 5 (shown in FIG. 1), is set to 90°, the decorative rotary member 5 first rotates clockwise through an angle of 90°. After the front of the decorative rotary member 5 returns to its initial position P, it rotates counterclockwise through an angle of 90°. Therefore, one cycle results in the rotational motion through a total rotation angle of 180°.

In accordance with an embodiment of the present invention, the total rotation angle is equally divided by 36, resulting in angles that increment by 5°, which are used to assign ROM locations of the memory circuit. The actuation pulses for the stepping motor are generated on the basis of a data table as shown in Table 1. The numeric values of the data represent the inter-pulse spacing in milliseconds. In Table 1, when the angular velocity $\omega$ of the decorative rotary member 5 is 0, the rotation angle $\Theta$ is 90°. Thus, the value of secant 90° becomes infinity. Consequently, the value of the inter-pulse spacing at the address which equals zero also becomes infinity. However, to keep the actual movement of the decorative rotary member 5 natural, the value of the inter-pulse spacing at the address which equals zero is set for convenience to be about 2 times the value at the rotation angle $\Theta = 85°$.

TABLE 1

| | Output Timing Table | |
|---|---|---|
| ROM location address N | Stored value ($= 1000 \times \sec \Theta$) | Rotation angle $\Theta$ of rotary decoration |
| 0 | 2345.6 | −90° |
| 1 | 1147.4 | −85° |
| 2 | 575.9 | −80° |
| 3 | 386.4 | −75° |
| 4 | 292.4 | −70° |
| 5 | 236.6 | −65° |
| 6 | 200.0 | −60° |
| 7 | 174.3 | −55° |
| 8 | 155.6 | −50° |
| 9 | 141.4 | −45° |
| 10 | 130.5 | −40° |
| 11 | 122.1 | −35° |
| 12 | 115.5 | −30° |
| 13 | 110.3 | −25° |
| 14 | 106.4 | −20° |
| 15 | 103.5 | −15° |
| 16 | 101.5 | −10° |
| 17 | 100.4 | −5° |
| 18 | 100.0 | 0° |
| 19 | 100.4 | 5° |
| 20 | 101.5 | 10° |
| 21 | 103.5 | 15° |
| 22 | 106.4 | 20° |
| 23 | 110.3 | 25° |
| 24 | 115.5 | 30° |
| 25 | 122.1 | 35° |
| 26 | 130.5 | 40° |
| 27 | 141.4 | 45° |
| 28 | 155.6 | 50° |
| 29 | 174.3 | 55° |
| 30 | 200.0 | 60° |
| 31 | 236.6 | 65° |
| 32 | 292.4 | 70° |
| 33 | 386.4 | 75° |
| 34 | 575.9 | 80° |
| 35 | 1147.4 | 85° |

Figure 5:
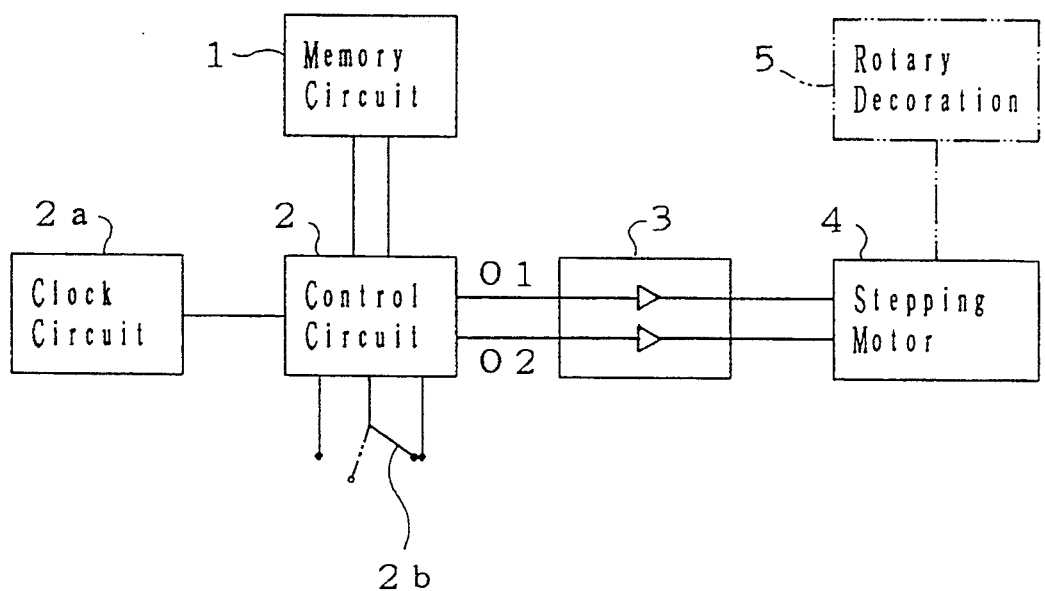
FIG. 5 is a schematic block diagram of the inventive driving device.

Referring to FIG. 5, a block schematic diagram of the inventive driving device is shown. The data table shown in Table 1 is stored in a memory circuit 1 (for example, a read-only memory). The memory circuit 1 is connected to control circuit 2 (for example, a central processing unit). The control circuit 2 designates an address N with respect to the memory circuit 1 so that the numeric value representative of the inter-pulse spacing which is stored in the location corresponding to the designated address N is accessed through a databus.

The control circuit 2 is further connected to a clock circuit 2a for converting the inter-pulse spacing into a temporal parameter and is also connected to a switch circuit 2b for controlling the rotational direction of the decorative rotary member 5.

The control circuit 2 provides two output signals, one for normal rotation 01 and the other for reverse rotation 02. These output signals are applied to a motor driving circuit 3 having separate output buffers. In accordance with the inter-pulse spacing delivered from the control circuit 2, the motor driving circuit applies a pulse signal to a stepping motor 4. The output shaft of the stepping motor 4 drives the decorative rotary member 5 via a wheel train as described hereinafter.

Figure 6:
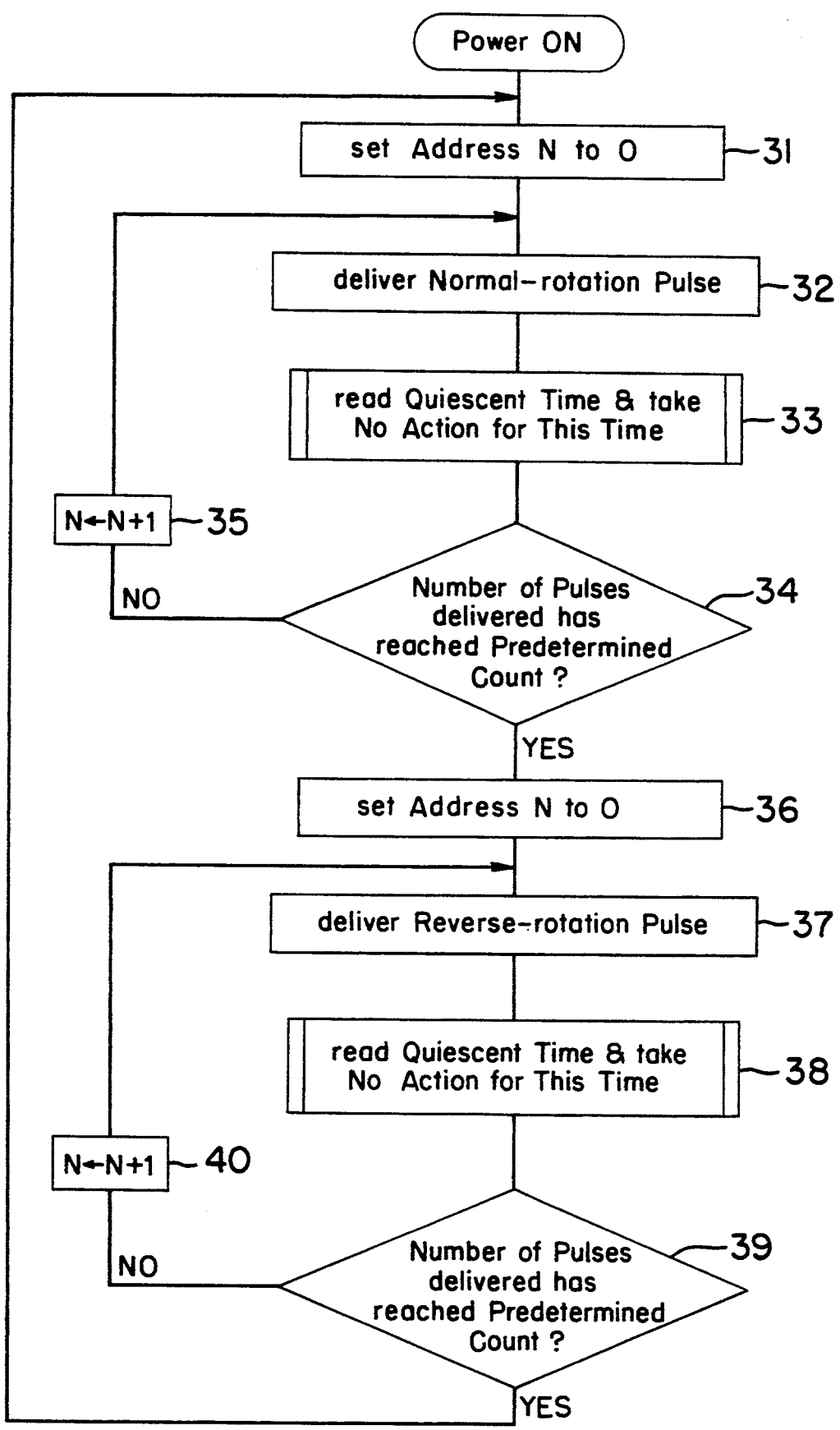
FIG. 6 is a flow chart of the processing operation of the inventive driving device.

Referring to FIG. 6, the operation of the present invention will be described. After source power is switched on, the control circuit 2 sets the address N for the memory circuit 1 to 0 (step 31), so that the motor driving circuit 3 delivers a normal-rotation pulse (step 32). As a result, the stepping motor 4 is stepped corresponding to one pulse. Next, the control circuit 2 reads a quiescent time between the next actuation pulse from the data table and takes no action for the quiescent time (step 33). The number of actuation pulses delivered is continuously counted in the counter of the control circuit 2, and the control circuit 2 determines whether or not the number of actuation pulses delivered has reached a predetermined actuation pulse count corresponding to half a cycle of a sine wave (step 34).

Before the predetermined count is reached, the address N is incremented by one (step 35), and the normal-rotation pulse is delivered once again, so that the stepping motor 4 rotationally drives the decorative rotary member 5. Since the stepping motor 4 performs its stepping action after the quiescent time defined at each address has elapsed, the variation of rotational speed of the stepping motor is regulated in accordance with each numeric value held in the data table. When the number of actuation pulses delivered reaches the predetermined count corresponding to half a cycle of the sine wave, i.e., when the normal-rotation pulse is delivered under the condition that the address N=35, the address N is set to 0 again (step 36). In this case, the output circuit of the control circuit 2 is switched so that a reverse-rotation pulse is delivered (step 37) causing the stepping motor to rotate reversely. Thereafter, similarly to the case of normal rotation, the quiescent time of the actuation pulses is read out, and no action is taken for the quiescent time (step 38), and the address N is incremented (step 40) until the number of actuation pulses delivered reaches the predetermined count corresponding to a half cycle of the sine wave (step 39). When the predetermined count is reached, i.e., when the address N reaches 35, control returns to the initial operation (step 31), so that the foregoing operation procedures are repeated to cause the decorative rotary member 5 to undergo reciprocative rotation motion.

A second embodiment of the present invention will now be described.

In this embodiment, the inter-pulse spacing d of the actuation pulses may be defined by $$d = (d_{max} - d_{min})/2 \times \cos(\Theta \times \Theta_{max}/360°) + (d_{max} + d_{min})/2$$

where $d_{max}$ is the maximum inter-pulse spacing, $d_{min}$ is the minimum inter-pulse spacing (these values being preferably set to 2,000 milliseconds and 350 milliseconds) and $\Theta_{max}$ is the maximum rotation angle which corresponds to $\Theta 1$ in FIG. 1. Where the rotation angle $\Theta 1$, corresponding to half a cycle of the decorative rotary member of FIG. 1, is set to 270°, the decorative rotary member 5 rotates clockwise through an angle of 270°. After it returns to the initial position, the decorative rotary member 5 rotates counterclockwise through an angle of 270°, so that the decorative rotary member rotates through a total rotation angle of 540° in one cycle. By determining the values of $d_{max}$, $d_{min}$ and $\Theta_{max}$ under the above conditions, and substituting them into the above equation, $$d = 825 \times \cos(1.5 \times \Theta) + 1175.$$

To obtain the inter-pulse spacing d of the actuation pulses by the use of this equation, similarly to the first embodiment, the rotation angle of the decorative rotary member is equally divided by 36, and the resulting individual angles (based on increments of 15°) are used to assign ROM locations of the memory circuit. The actuation pulses for the stepping motor are generated on the basis of a data table as shown in Table 2, where each numeric value represents the inter-pulse spacing in milliseconds.

TABLE 2

| | Output Timing Table | |
|---|---|---|
| ROM location address N | Stored value (data) | Rotation angle $\Theta$ of rotary decoration |
| 0 | 1758.4 | −270° |
| 1 | 1937.2 | −255° |
| 2 | 2000.0 | −240° |
| 3 | 1937.2 | −225° |
| 4 | 1758.4 | −210° |
| 5 | 1490.7 | −195° |
| 6 | 1175.0 | −180° |
| 7 | 859.3 | −165° |
| 8 | 591.6 | −150° |
| 9 | 412.8 | −135° |
| 10 | 350.0 | −120° |
| 11 | 412.8 | −105° |
| 12 | 591.6 | −90° |
| 13 | 859.3 | −75° |
| 14 | 1175.0 | −60° |
| 15 | 1590.7 | −45° |
| 16 | 1758.4 | −30° |
| 17 | 1937.2 | −15° |
| 18 | 2000.0 | 0° |
| 19 | 1937.2 | 15° |
| 20 | 1758.4 | 30° |
| 21 | 1490.7 | 45° |
| 22 | 1175.0 | 60° |
| 23 | 859.3 | 75° |
| 24 | 591.6 | 90° |
| 25 | 412.8 | 105° |
| 26 | 350.0 | 120° |
| 27 | 412.8 | 135° |
| 28 | 591.6 | 150° |
| 29 | 859.3 | 165° |
| 30 | 1175.0 | 180° |
| 31 | 1490.7 | 195° |
| 32 | 1758.4 | 210° |
| 33 | 1937.2 | 225° |
| 34 | 2000.0 | 240° |
| 35 | 1937.2 | 255° |

As described above, with reference to FIG. 6, the inter-pulse spacing of the actuation pulses of the stepping motor is dependent on the numeric values of the data table, so that the rotational speed of the decorative rotary member 5 varies in conformity with a sine curve. Therefore, the rotational speed of the decorative rotary member 5 will exhibit smooth movement as if it were driven via a hair spring undergoing reciprocative rotation. Since the rotation angle Θ or rotation period of the decorative rotary member 5 is determined by the data table, any desired rotational motion can be readily realized by writing adequate data into the memory circuit 1. Therefore, in accordance with the present invention, the numeric values representative of the inter-pulse spacing of the actual pulses may be values which are effective to control the rotation angle of the rotary member in conformity with a secant function.

Thus, in accordance with the present invention, the mass and rotation period of the decorative rotary member 5 does not have to be taken into account as was required by the conventional mechanism using the hair spring.

Figure 7:
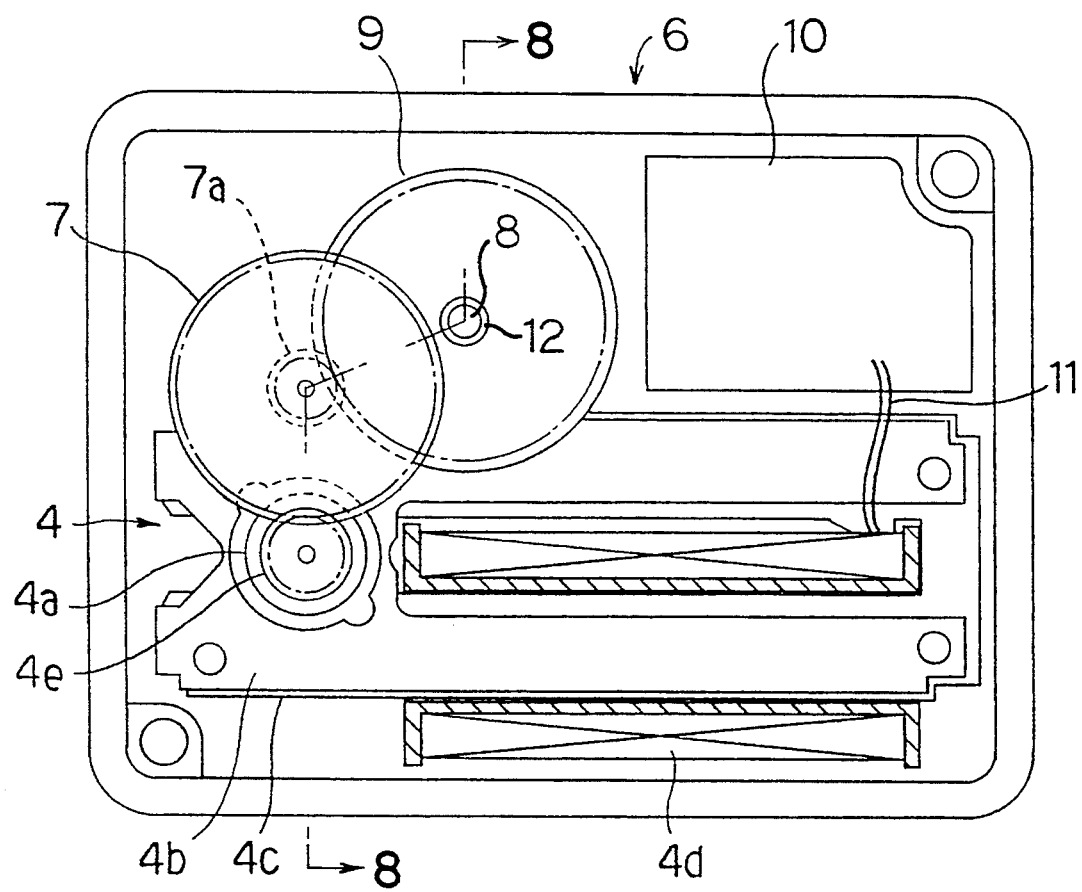
FIG. 7 is a partial cross section of a plan view of an embodiment of the inventive driving device.
Figure 8:
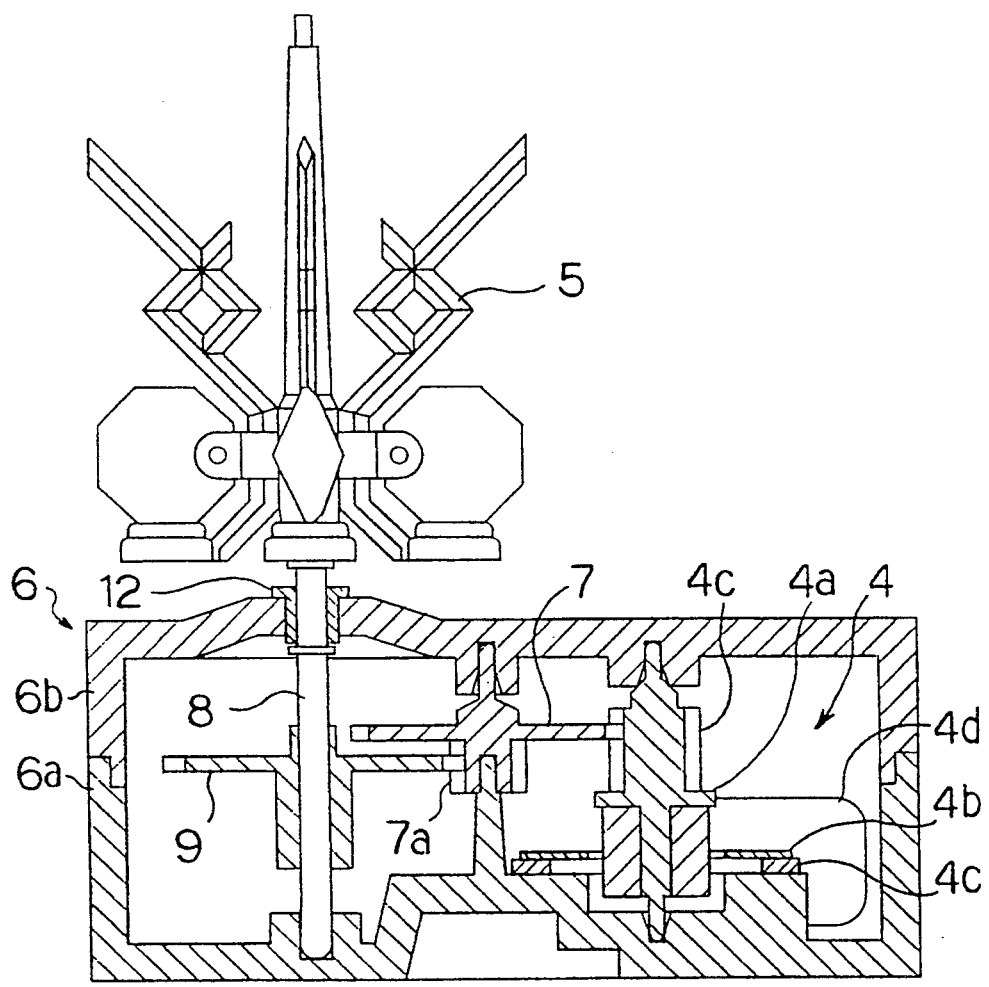
FIG. 8 is sectional view taken along lines A—A in FIG. 7.

Referring to FIGS. 7 and 8, an embodiment of the inventive driving device for driving a rotary member will be described. A casing 6 is made of lower and upper cases 6a and 6b, and the stepping motor 4 is disposed in a vertical position with its rotor 4a supported in the lower case 6a. The stepping motor 4 includes two stators 4b and 4c and a drive coil 4d wound therearound. An upper portion of the rotor 4a has a rotor pinion 4e integrally connected therewith. The rotor pinion 4e together with a drive wheel 7, a drive pinion 7a which is integral with the drive wheel 7, an output shaft 8 and an output wheel 9 which is integral with the output shaft 8, constitute a wheel train for transmitting the turning force of reciprocative rotation to the decorative rotary member 5.

A printed circuit board 10 is disposed inside the casing 6. The printed circuit board 10 includes the memory circuit 1, the control circuit 2, the motor driving circuit 3 and other circuit elements, and is connected through lead wires 11 to the stepping motor 4.

The output shaft 8 is rotatably supported at its lower end by the lower case 6a and at its upper portion via a bushing 12 by the upper case 6b. The upper end of the output shaft 8 projects upward from the casing 6. The decorative rotary member 5 is attached to the upper end of the output shaft 8 and is rotatable therewith.

Figure 9:
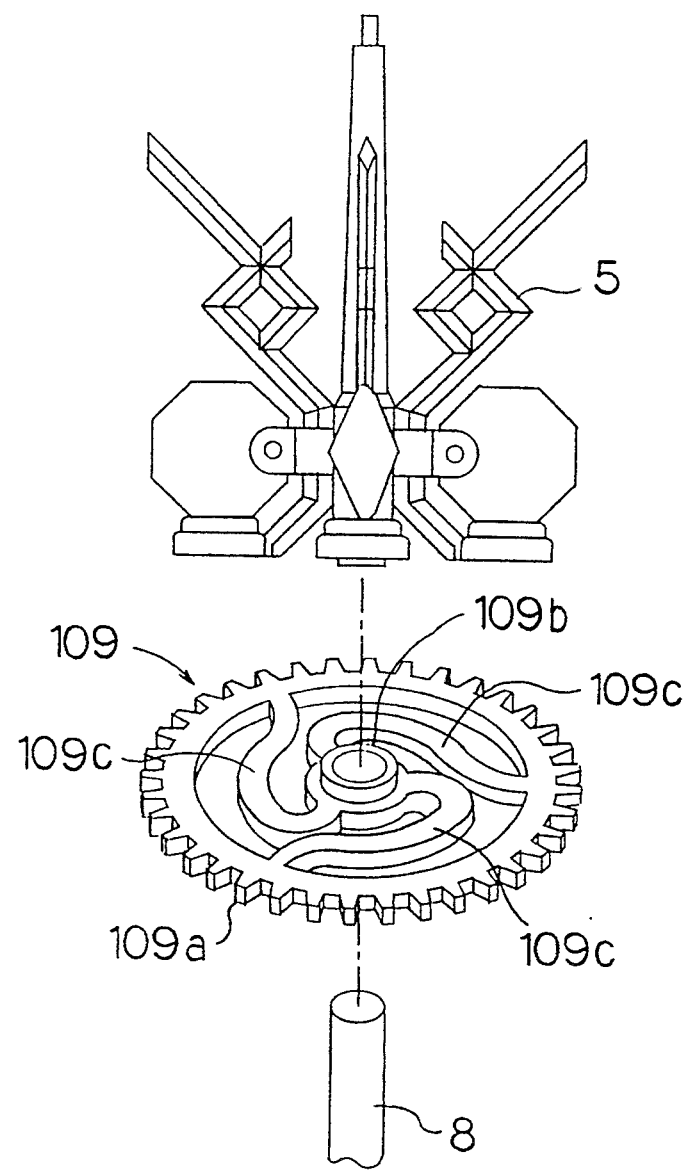
FIG. 9 is a perspective view showing an alternative embodiment of an output wheel of the inventive driving device.

FIG. 9 shows an output wheel 109 which has moderating means for moderating the motion of the decorative rotary member. The output wheel 109 has a tooth portion 109a which is engaged with the drive pinion 7a and a boss portion 109b which is fitted and coupled to the output shaft 8. The tooth portion 109a and the boss portion 109b are connected together by three curved, long and resilient arms 109c. Thus, the resilient arms 109c support the output wheel 109 and are effective for absorbing relatively sudden rotational drive pulses from the stepping motor 4. Therefore, when the intermittent rotational motion of the stepping motor 4, as caused by each actuation pulse, is transmitted to the tooth portion 109a, the intermittent motion is moderated by the resilient arms 109c, so that a smooth speed variation is introduced into the rotational motion of the decorative rotary member 5.

As described above, in accordance with the present invention, a memory circuit 1 has a data table in which data is stored for control of the operation timing of the driving of a decorative rotary member. A control circuit controls the stepping motor on the basis of the data table so that the reciprocative rotational motion of the decorative rotary member can be set as desired. Thus in accordance with the present invention, graceful motion is imparted to the decorative rotary member. Furthermore, in accordance with the present invention, the speed of the reciprocative rotation can vary in conformity with a sine curve without the use of the conventional temp type driving system which requires a hair spring. Thus in accordance with the present invention, graceful and smooth driving of a reciprocatively rotated decorative rotary member is provided without the requirement of expensive parts or difficult manufacturing.

With respect to the above description, it is realized that the optimum dimensional relationships for parts of the invention, including variation in size, materials, shape, form, function, and manner of operation, assembly, and use, are deemed readily apparent and obvious to one ordinarily skilled in the art. All equivalent relationships to those illustrated in the drawings and described in this specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modification and equivalents may be resorted to, falling within the scope of the invention.

We claim:

1. A driving device for driving a decorative rotary member provided to enhance the ornamentation of a clock, comprising: a decorative rotary member; driving means mechanically connected to the rotary member for reciprocatively rotationally driving the decorative rotary member; storing means for storing data including numerical values representative of inter-pulse spacing of actuation pulses effective to control rotation of the decorative rotary member; and controlling means for controlling the driving means by the actuation pulses dependent on the stored data, whereby the controlling means applies a driving energy to the driving means during a duration of each actuation pulse to reciprocatively rotationally drive the decorative rotary member.

2. A driving device for driving a decorative rotary member according to claim 1; wherein the data includes numeric values representative of inter-pulse spacing of the actuation pulses effective to control a rotational speed of the decorative rotary member in conformity with a sine curve.

3. A driving device for driving a decorative rotary member according to claim 1; wherein the data includes numeric values representative of inter-pulse spacing of the actuation pulses effective to control a rotative angle of the decorative rotary member in conformity with a secant function.

4. A driving device for driving a decorative rotary member according to claim 1; wherein the driving means includes a stepping motor.

5. A driving device for driving a decorative rotary member according to claim 4; wherein the driving means further includes an output wheel having moderating means for moderating the motion of the decorative rotary member.

6. A driving device for driving a decorative rotary member according to claim 5; wherein the moderating means includes resilient members supporting the output wheel and effective for absorbing relatively sudden rotational drive pulses from the stepping motor so that the reciprocating motion of the decorative rotary member is smooth.

7. A driving device for driving a decorative rotary member according to claim 1; wherein the data includes numeric values representative of inter-pulse spacing of the actuation pulses effective to control a rotational speed of the decorative rotary member in conformity with the following equation:

$$d = (d_{max} - d_{min})/2 \times \cos(\theta \times \theta_{max}/360) + (d_{max} - d_{min})/2$$

where $d_{max}$ is a maximum inter-pulse spacing, $d_{min}$ is a minimum inter-pulse spacing, and $\theta_{max}$ is a maximum rotation angle of the decorative rotary member.

8. A driving device for driving a decorative rotary member of a clock, comprising: a decorative rotary member; a stepping motor mechanically connected to the rotary member and rotatable in opposite directions for reciprocatively driving the decorative rotary member; a memory circuit for storing a data table on the basis of which an operation timing of the stepping motor is determined; and a control circuit for controlling the actuation of the stepping motor on the basis of the data stored in the memory circuit to reciprocatively rotationally drive the decorative rotary member.

9. A driving device for driving a decorative rotary member according to claim 8; wherein the data table is made up of numeric values representative of the inter-pulse spacing of actuation pulses for the stepping motor which are set such that the rotational speed of the decorative rotary member varies in conformity with a sine curve.

10. A driving device for driving a decorative rotary member according to claim 8; wherein the data table is made up of numeric values representative of the inter-pulse spacing of actuation pulses for the stepping motor which are set such that the rotative angle of the decorative rotary member varies in conformity with a secant function.

11. A driving device for driving a decorative rotary member according to claim 8; further including an output wheel driven by the stepping motor for driving the decorative rotary member, and moderating means for moderating the motion of the decorative rotary member.

12. A driving device for driving a decorative rotary member according to claim 10; wherein the moderating means comprises resilient members supporting the output wheel and effective for absorbing sudden rotational drive pulses from the stepping motor to thereby smoothen the reciprocating motion of the decorative rotary member.

13. A driving device for driving a decorative rotary member provided to enhance the ornamentation of a clock, comprising: a decorative rotary member; driving means for reciprocatively rotationally driving the decorative rotary member; storing means for storing data including numerical values representative of inter-pulse spacing of actuation pulses effective to control rotation of the decorative rotary member in conformity with a sine curve; and controlling means for controlling the driving means by the actuation pulses dependent on the stored data; whereby the controlling means applies a driving energy to the driving means during a duration of each actuation pulse to reciprocatively rotationally drive the decorative rotary member.

14. A driving device for driving a decorative rotary member according to claim 13; wherein the driving means includes a stepping motor.

15. A driving device for driving a decorative rotary member according to claim 13; wherein the driving means further includes an output wheel having moderating means for moderating the motion of the decorative rotary member.

16. A driving device for driving a decorative rotary member according to claim 15; wherein the moderating means includes resilient members supporting the output wheel and effective for absorbing relatively sudden rotational drive pulses from the stepping motor so that the reciprocating motion of the decorative rotary member is smooth.

17. A driving device for driving a decorative rotary member according to claim 14; wherein the driving means further includes an output wheel having moderating means for moderating the motion of the decorative rotary member.

18. A driving device for driving a decorative rotary member according to claim 15; wherein the moderating means includes resilient members supporting the output wheel and effective for absorbing relatively sudden rotational drive pulses from the stepping motor so that the reciprocating motion of the decorative rotary member is smooth.

19. A driving device for driving a decorative rotary member provided to enhance the ornamentation of a clock, comprising: a decorative rotary member; driving means for reciprocatively rotationally driving the decorative rotary member; storing means for storing data including numerical values representative of inter-pulse spacing of actuation pulses effective to control rotation of the decorative rotary member in conformity with a secant function; controlling means for controlling the driving means by the actuation pulses dependent on the stored data; whereby the controlling means applies a driving energy to the driving means during a duration of each actuation pulse to reciprocatively rotationally drive the decorative rotary member.

20. A driving device for driving a decorative rotary member according to claim 19; wherein the driving means includes a stepping motor.

* * * * *